United States Patent
Shelman-Cohen

(10) Patent No.: US 10,352,171 B2
(45) Date of Patent: *Jul. 16, 2019

(54) REDUCED DRAG SYSTEM FOR WINDMILLS, FANS, PROPELLERS, AIRFOILS, AND HYDROFOILS

(71) Applicant: Alexander J. Shelman-Cohen, Belmont, MA (US)

(72) Inventor: Alexander J. Shelman-Cohen, Belmont, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,315

(22) Filed: Jun. 19, 2018

(65) Prior Publication Data
US 2018/0298762 A1   Oct. 18, 2018

Related U.S. Application Data

(60) Continuation-in-part of application No. 14/247,958, filed on Apr. 8, 2014, now Pat. No. 10,001,015, (Continued)

(51) Int. Cl.
*B64C 21/00* (2006.01)
*F01D 5/14* (2006.01)
(Continued)

(52) U.S. Cl.
CPC ............ *F01D 5/145* (2013.01); *B63B 1/34* (2013.01); *B64C 11/20* (2013.01); *B64C 21/10* (2013.01);
(Continued)

(58) Field of Classification Search
CPC ............................. B64C 21/00; B64C 21/02
(Continued)

(56) References Cited

U.S. PATENT DOCUMENTS 2,873,931 A   2/1959 Fleischmann
3,578,264 A   5/1971 Kuethe
(Continued)

OTHER PUBLICATIONS

Hohlfeld, Robert G., et al. "Self-Similarity and the Geometric Requirements for Frequency Independence in Antennae," Fractals, vol. 7, No. 1, pp. 79-84 (1999).
(Continued)

*Primary Examiner* — Tien Q Dinh
*Assistant Examiner* — Michael A. Fabula
(74) *Attorney, Agent, or Firm* — Cesari and McKenna, LLP

(57) ABSTRACT

Airfoil and hydrofoils systems with structures having a surface texture defined by fractal geometries are described. Raised portions or fractal bumps can be included on the surfaces, forming a surface texture. The surface textures can be defined by two-dimensional fractal shapes, partial two-dimensional fractal shapes, non-contiguous fractal shapes, three-dimensional fractal objects, and partial three-dimensional fractal objects. The surfaces can include indents having fractal geometries. The indents can have varying depths and can be bordered by other indents, or bumps, or smooth portions of the airfoil or hydrofoil structure. The fractal surface textures can reduce vortices inherent from airfoil and hydrofoil structures. The roughness and distribution of the fractal surface textures reduce the vortices, improving laminar flow characteristics and at the same time reducing drag. The systems are passive and do not require applied power.

4 Claims, 5 Drawing Sheets

Related U.S. Application Data which is a division of application No. 12/606,764, filed on Oct. 27, 2009, now abandoned.

(60) Provisional application No. 61/198,037, filed on Nov. 1, 2008.

(51) Int. Cl.

| | |
|---|---|
| *F03D 1/06* | (2006.01) |
| *B64C 21/10* | (2006.01) |
| *B63B 1/34* | (2006.01) |
| *B64C 11/20* | (2006.01) |
| *C09K 3/00* | (2006.01) |
| *F15D 1/12* | (2006.01) |
| *F04D 29/00* | (2006.01) |

(52) U.S. Cl.
CPC ............ *C09K 3/00* (2013.01); *F03D 1/0608* (2013.01); *F03D 1/0633* (2013.01); *F04D 29/00* (2013.01); *F15D 1/12* (2013.01); *B64C 2230/26* (2013.01); *F05B 2240/30* (2013.01); *F05B 2250/61* (2013.01); *F05D 2250/131* (2013.01); *F05D 2250/18* (2013.01); *F05D 2250/21* (2013.01); *F05D 2250/28* (2013.01); *F05D 2250/61* (2013.01); *F05D 2250/63* (2013.01); *Y02E 10/721* (2013.01); *Y02T 50/166* (2013.01); *Y02T 70/121* (2013.01)

(58) Field of Classification Search
USPC ......... 244/200.1, 199.1, 200, 201, 198, 130, 244/199.4; 416/223 R, 90 R; 441/30, 55
See application file for complete search history.

(56) References Cited

U.S. PATENT DOCUMENTS

| | | |
|---|---|---|
| 3,612,446 A | 10/1971 | Lebert |
| 3,732,839 A | 5/1973 | Schuster et al. |
| 4,284,302 A | 8/1981 | Drews |
| 4,650,138 A | 3/1987 | Grose |
| 4,694,407 A | 9/1987 | Ogden |
| 4,736,912 A | 4/1988 | Loebert |
| 4,787,638 A | 11/1988 | Kobayashi |
| 4,802,642 A | 2/1989 | Mangiarotty |
| 4,813,633 A | 3/1989 | Werle et al. |
| 4,830,378 A | 5/1989 | Aoyama |
| 4,932,612 A | 6/1990 | Blackwelder et al. |
| 5,132,831 A | 7/1992 | Shih et al. |
| 5,133,516 A | 7/1992 | Marentic |
| 5,171,623 A | 12/1992 | Yee |
| 5,200,573 A | 4/1993 | Blood |
| 5,289,997 A | 3/1994 | Harris |
| 5,355,318 A | 10/1994 | Dionnet et al. |
| 5,378,524 A | 1/1995 | Blood |
| 5,540,406 A | 7/1996 | Occhipinti |
| 5,803,409 A | 9/1998 | Keefe |
| 5,803,410 A | 9/1998 | Hwang |
| 5,842,937 A | 12/1998 | Dalton et al. |
| 6,119,987 A | 9/2000 | Kiknadze et al. |
| 6,276,636 B1 | 8/2001 | Krastel |
| 6,357,374 B1 | 3/2002 | Moore et al. |
| 6,409,615 B1 | 6/2002 | McGuire et al. |
| 6,415,730 B1 | 7/2002 | Barker |
| 6,452,553 B1 | 9/2002 | Cohen |
| 6,892,989 B1 | 5/2005 | Whitmore et al. |
| 7,114,785 B2 | 10/2006 | Ording et al. |
| 7,126,537 B2 | 10/2006 | Cohen |
| 7,143,709 B2 | 12/2006 | Brennan et al. |
| 7,290,738 B1 | 11/2007 | Rogers et al. |
| 7,303,491 B2 | 12/2007 | Narducci et al. |
| 7,318,619 B2 | 1/2008 | Munro et al. |
| 7,331,752 B2 | 2/2008 | Kiknadze et al. |
| 7,513,839 B2 | 4/2009 | Narducci et al. |
| 7,604,461 B2 | 10/2009 | Bonnet |
| 7,650,848 B2 | 1/2010 | Brennan et al. |
| 7,735,782 B2 | 6/2010 | Kloker et al. |
| 8,113,469 B2 | 2/2012 | Lang |
| 8,276,851 B2 | 10/2012 | Mckeon |
| 8,315,847 B1 | 11/2012 | Schmidt |
| 8,579,360 B2 | 11/2013 | Litchfield |
| 8,757,556 B2 | 6/2014 | Rist et al. |
| 2006/0099122 A1 | 5/2006 | Vida |
| 2006/0134379 A1 | 6/2006 | Pulkka |
| 2006/0219143 A1 | 10/2006 | Brennan et al. |
| 2007/0018055 A1 | 1/2007 | Schmidt |
| 2009/0285691 A1 | 11/2009 | Grabau |
| 2009/0294596 A1 | 12/2009 | Sinha et al. |
| 2010/0108813 A1 | 5/2010 | Lang |
| 2010/0243819 A1 | 9/2010 | Stanislas et al. |
| 2010/0301612 A1 | 12/2010 | Lee |

OTHER PUBLICATIONS

De Rham, Georges. "On Some Curves Defined by Functional Equations," reprinted in Classics on Fractals, ed. Gerald A. Edgar (Addison-Wesley, 1993), pp. 285-298.
Office Action dated Mar. 1, 2013 in U.S. Appl. No. 12/606,764.
Office Action dated Sep. 12, 2013 in U.S. Appl. No. 12/606,764.
Office Action dated Jan. 13, 2015 in U.S. Appl. No. 14/247,958.
Office Action dated Aug. 14, 2015 in U.S. Appl. No. 14/247,958.
Office Action dated Mar. 18, 2016 in U.S. Appl. No. 14/247,958.
Office Action dated Oct. 5, 2016 in U.S. Appl. No. 14/247,958.
Office Action dated Jan. 30, 2017 in U.S. Appl. No. 14/247,958.
Office Action dated Jan. 24, 2018 in U.S. Appl. No. 14/247,958.
Notice of Allowance dated Apr. 3, 2018 in U.S. Appl. No. 14/247,958.

102A
3rd and 4th
Iteration
Koch Stars

FIG. 8
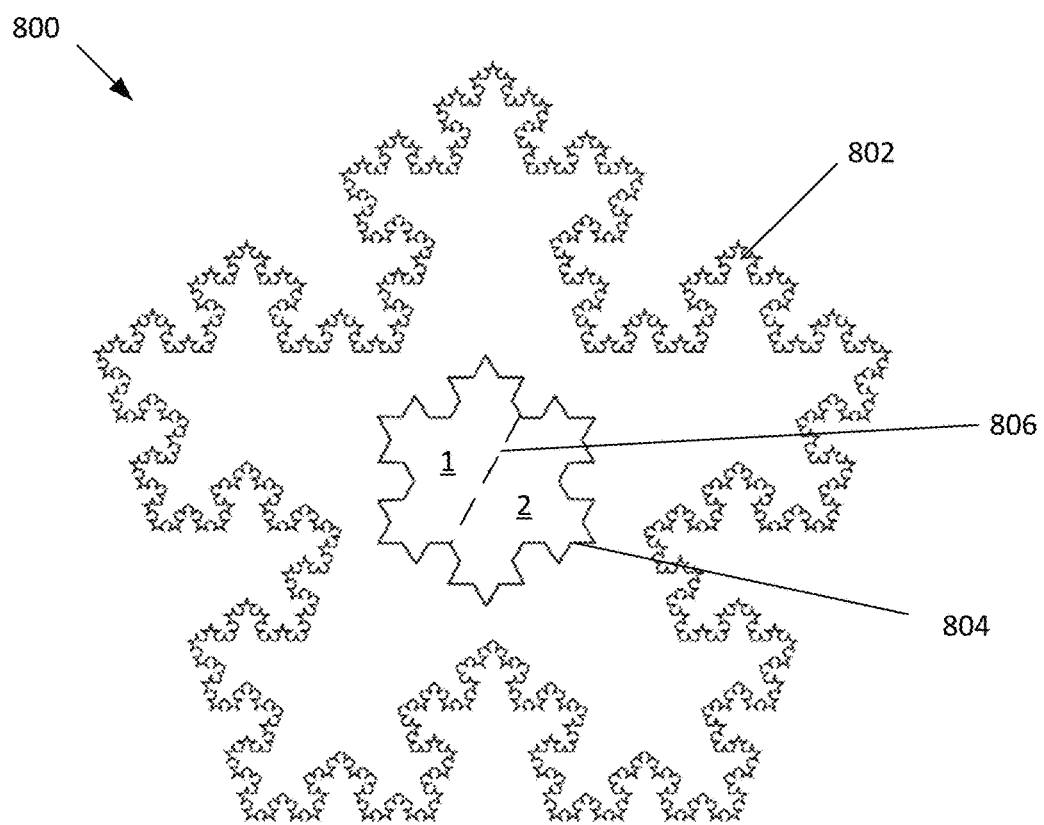
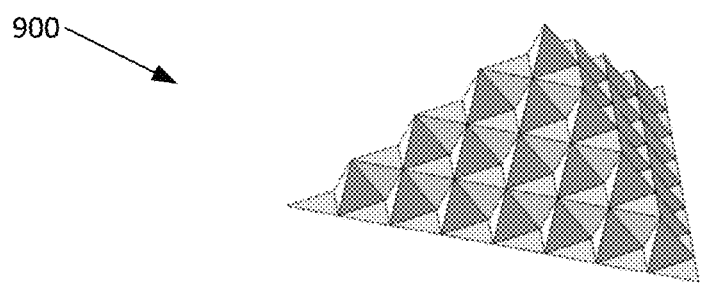
FIG. 9

REDUCED DRAG SYSTEM FOR WINDMILLS, FANS, PROPELLERS, AIRFOILS, AND HYDROFOILS

RELATED APPLICATIONS

This application is a continuation-in-part of U.S. patent application Ser. No. 14/247,958 originally titled "Reduced Drag System for Windmills, Fans, Propellers, Airfoils and Hydrofoils," filed Apr. 8, 2014, later changed to "Drag Reduction Systems Having Fractal Geometry/Geometrics," which is a division of U.S. patent application Ser. No. 12/606,764 entitled "Reduced Drag System for Windmills, Fans, Propellers, Airfoils and Hydrofoils," filed Oct. 27, 2009, which claims the benefit of U.S. Provisional Patent Application No. 61/198,037, entitled "Reduced Drag System for Windmills, Fans, Propellers, and Airfoils," filed Nov. 1, 2008; the entire contents of all of which are incorporated herein by reference for all purposes.

BACKGROUND

There are numerous prior art airfoil and hydrofoil structures, such as a common commercial airplane wing. The surface textures of such structures are typically smooth or include small surface protrusions such as pop rivets and the like. All of such surfaces are typically defined by Euclidean geometry and produce well-known turbulence effects.

Many fluid dynamics phenomena, such as aerodynamic turbulence, however, do not possess Euclidean geometric characteristics. They can, on the other hand, be analyzed using fractal geometry. Fractal geometry comprises an alternative set of geometric principles conceived and developed by Benoit B. Mandelbrot. An important treatise on the study of fractal geometry is Mandelbrot's The Fractal Geometry of Nature.

As discussed in Mandelbrot's treatise, many forms in nature are so irregular and fragmented that Euclidean geometry is not adequate to represent them. In his treatise, Mandelbrot identified a family of shapes, which described the irregular and fragmented shapes in nature, and called them fractals. A fractal is defined by its topological dimension $D_T$ and its Hausdorff dimension D. As defined, $D_T$ is always an integer, D need not be an integer, and $D \geq D_T$. (See p. 15 of Mandelbrot's The Fractal Geometry of Nature). Fractals may be represented by two-dimensional shapes and three-dimensional objects. In addition, fractals possess self-similarity in that they have the same shapes or structures on both small and large scales.

It has been found that fractals have characteristics that are significant in a variety of fields. For example, fractals correspond with naturally occurring phenomena such as aerodynamic phenomena. In addition, three-dimensional fractals have very specific electromagnetic wave-propagation properties that lead to special wave-matter interaction modes. Fractal geometry is also useful in describing naturally occurring forms and objects such as a stretch of coastline. Although the distance of the stretch may be measured along a straight line between two points on the coastline, the distance may be more accurately considered infinite as one considers in detail the irregular twists and turns of the coastline.

Fractals can be generated based on their property of self-similarity by means of a recursive algorithm. In addition, fractals can be generated by various initiators and generators as illustrated in Mandelbrot's treatise.

An example of a three-dimensional fractal is illustrated in U.S. Pat. No. 5,355,318 to Dionnet et al., the entire contents of which are incorporated herein by reference. The three-dimensional fractal described in this patent is referred to as Serpienski's mesh. This mesh is created by performing repeated scaling reductions of a parent triangle into daughter triangles until the daughter triangles become infinitely small. The dimension of the fractal is given by the relationship (log N)/(log E) where N is the number of daughter triangles in the fractal and E is a scale factor.

Some processes for making self-similar three-dimensional fractals is known. For example, the Dionnet et al. patent discloses methods of enabling three-dimensional fractals to be manufactured. The method consists in performing repeated scaling reductions on a parent generator defined by means of three-dimensional coordinates, in storing the coordinates of each daughter object obtained by such a scaling reduction, and in repeating the scaling reduction until the dimensions of a daughter object become less than a given threshold value. The coordinates of the daughter objects are then supplied to a stereolithographic apparatus which manufactures the fractal defined by assembling together the daughter objects.

In addition, U.S. Pat. No. 5,132,831 to Shih et al. discloses an analog optical processor for performing affine transformations and constructing three-dimensional fractals that may be used to model natural objects such as trees and mountains. An affine transformation is a mathematical transformation equivalent to a rotation, translation, and contraction (or expansion) with respect to a fixed origin and coordinate system. There are also a number of prior-art patents directed toward two-dimensional fractal image generation. For example, European Patent No. 0 463 766 A2 to Applicant GEC-Marconi Ltd. discloses a method of generating fractal images representing fractal objects. This invention is particularly applicable to the generation of terrain images. In addition, U.S. Pat. No. 4,694,407 to Ogden discloses fractal generation, as for video graphic displays. Two-dimensional fractal images are generated by convolving a basic shape, or "generator pattern," with a "seed pattern" of dots, in each of different spatial scalings.

Fractal patterns have be used for radio receivers and transceivers, as described in U.S. Pat. No. 6,452,553 to Cohen, and U.S. Pat. No. 7,126,537 to Cohen, the entire contents of both of which are incorporated herein by reference. See also Hohlfeld, R., and Cohen, N., "SELF-SIMILARITY AND THE GEOMETRIC REQUIREMENTS FOR FREQUENCY INDEPENDENCE IN ANTENNAE," Fractals, Vol. 7, No. 1 (1999) 79-84, the entire contents of which are incorporated herein by reference.

Thus, as current techniques for shaping airfoils, hydrofoils, and other fluid-contact surfaces are based on Euclidean geometries, such surfaces create undesirable turbulences effects, including reduced fuel efficiency and reduced maneuverability. Additional undesirable turbulence effects can include the potentially deleterious eddy currents or vortexes produced by large scale commercial aircraft, which can pose problems or hazards for other aircraft including smaller commercial and private aircraft. Consequently, there a need exists to improve surfaces of airfoils and hydrofoils for reduced drag and improved manuererability characteristics.

SUMMARY

Aspects and embodiments of the present disclosure address the shortcomings noted previously by implementing or providing fractal shaped surface features to airfoils and hydrofoils, as well as other fluid-contact surfaces.

Embodiments, of the present disclosure are directed to airfoil and hydrofoils systems with structures having a surface texture defined by fractal geometries. Raised portions or fractal bumps can be included on the surfaces, forming a surface texture. The surface textures can be defined by two-dimensional fractal shapes, partial two-dimensional fractal shapes, non-contiguous fractal shapes, three-dimensional fractal objects, and partial three-dimensional fractal objects. The surfaces can include indents or depressions having fractal geometries. The indents can have varying depths and can be bordered by other indents, or bumps, or smooth portions of the airfoil or hydrofoil structure. The fractal surface textures can reduce vortices inherent from airfoil and hydrofoil structures. The roughness and distribution of the fractal surface textures reduce the vortices, improving laminar flow characteristics and at the same time reducing drag. The systems are passive and do not require applied power.

In exemplary embodiments, the distribution of the fractal features themselves can also have a fractal nature, such as conforming to a logarithmic distribution in one or more directions along the airfoil or hydrofoil. Some embodiments can include small holes or pin holes having such a distribution. Fluid such as air or water can be caused to flow from such holes to reduce turbulence, in some applications.

Other features and advantages of the present disclosure will be understood upon reading and understanding the detailed description of exemplary embodiments, described herein, in conjunction with reference to the drawings.

BRIEF DESCRIPTION OF THE DRAWINGS

Aspects of the present disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 8 depicts an exemplary embodiment of a fractal fluid contact surface having a fractal protrusion combined with a fractal depression, in accordance with present disclosure.

FIG. 9 depicts an exemplary embodiment of a fractal fluid contact surface having a fractal protrusion with multiple layers and heights, formed as a von Koch surface, in accordance with present disclosure.

Figure 1A:
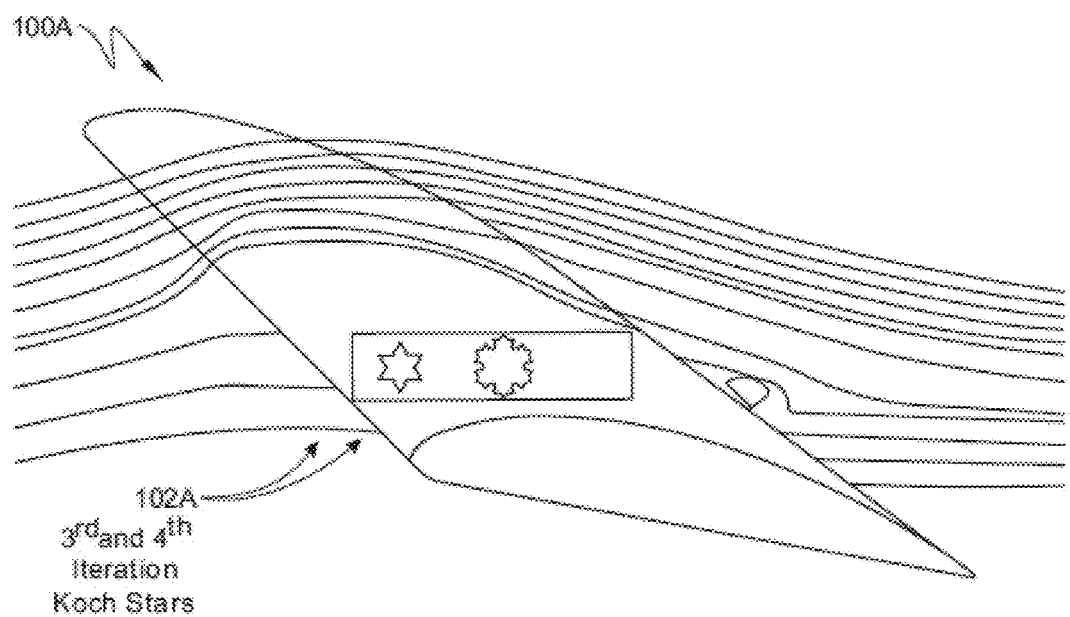
FIG. 1A depicts a perspective view of a representative airfoil having fractal surface features, in accordance with an exemplary embodiment of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

As described previously, embodiments of the present disclosure are directed to airfoils and hydrofoils, and systems using the same, in which fluid-contacting structures (e.g., wings, fins, etc.) have a surface texture defined by fractal geometries. By inclusion of the fractal-based textures or shapes, reduced drag and increased maneuverability can be provided.

Raised portions or fractal bumps can be included on the surfaces, forming a surface texture. The surface textures can be defined by two-dimensional fractal shapes, partial two-dimensional fractal shapes, non-contiguous fractal shapes, three-dimensional fractal objects, and partial three-dimensional fractal objects. The surfaces can include indents or depressions having fractal geometries. The indents can have varying depths and can be bordered by other indents, or bumps, or smooth portions of the airfoil or hydrofoil structure. The fractal surface textures can reduce vortices inherent from airfoil and hydrofoil structures. The roughness and distribution of the fractal surface textures reduce the vortices, improving laminar flow characteristics and at the same time reducing drag. The systems are passive and do not require applied power.

The distribution of the fractal features itself can also have a fractal nature, such as conforming to a logarithmic distribution in one or more directions along the airfoil or hydrofoil. Some embodiments can include small holes or pin holes having such a distribution. In exemplary embodiments, the small holes can allow forced gas or liquid to flow out of the airfoil or hydrofoil surface to further minimize deleterious turbulence effects. Water or compressed gas (air) can be used, for example, as described in U.S. Pat. No. 7,290,738, the entire contents of which are incorporated herein by reference.

Fractal shapes described herein can be fabricated or made for hydrofoil and airfoil surfaces by computer-aided design, computer-aided manufacturing ("CAD" or "CAM") techniques. Suitable techniques are described in U.S. Pat. No. 5,355,318 to Dionnet et al., which is incorporated herein by reference in its entirety. Plates or surfaces having 3D fractal shapes can be affixed to or incorporated in a portion of an airfoil or hydrofoil.

FIG. 1A depicts a perspective view of a representative fluid-contact surface, e.g., an airfoil or hydrofoil, having fractal-based surface features 102A, in accordance with an exemplary embodiment of the present disclosure. Surface fractal features 102A can be indentations (or, indents) or protrusions or mixtures of the two. In the figure, two fractal surface features are shown as being 3rd and 4th iteration Koch stars. Of course, other fractal shapes can be used. The surface features can function with the fluid-contact surface as a turbulence reduction system. In exemplary embodiments closed, or semi-closed fractals can be utilized for an outline of a fractal texture or surface according to the present disclosure. Non-closed surface features, e.g., a fern shape or other dendritic shapes, can be used for some applications. As is described in further detail below, such fractal-based surface features can include holes or apertures distributed on a fluid contact surface in a "fractal" distribution such as a logarithmic progression. The fractal-based surface features can be formed directly into or on the underlying fluid-contact surface or can be made in or formed on another surface that is attached to a fluid-contact surface.

Suitable fractal patterns are described in U.S. Pat. No. 6,452,553 to Cohen, and U.S. Pat. No. 7,126,537 to Cohen, the entire contents of both of which are incorporated herein by reference. See also Hohlfeld, R., and Cohen, N., "SELF-SIMILARITY AND THE GEOMETRIC REQUIREMENTS FOR FREQUENCY INDEPENDENCE IN ANTENNAE," Fractals, Vol. 7, No. 1 (1999) 79-84, the entire contents of which are incorporated herein by reference.

Figure 1B:
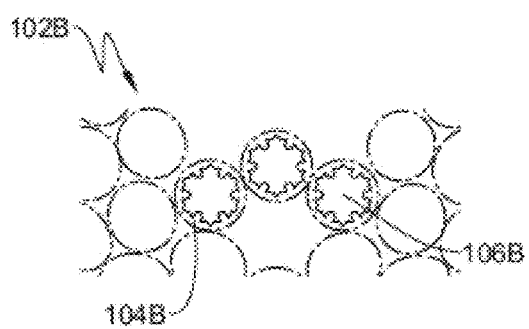
FIG. 1B depicts a top view of a fractal surface, based on a Koch star, for fluid-contact surfaces, in accordance with exemplary embodiments of the present disclosure.

FIG. 1B depicts a top view of a fractal-textured fluid contact surface 102B, based on a Koch star, for fluid-contact surfaces, in accordance with exemplary embodiments of the present disclosure. Surface 102B includes multiple units 104B, each having a fractal shape 106B. Each fractal shape 106B can have a desired topographic profile (or profile normal to the surrounding fluid contact surface), e.g., wing or fin.

Figure 1C:
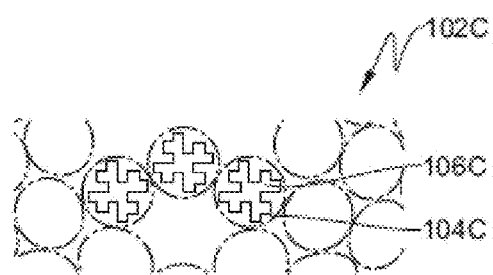
FIG. 1C depicts a top view of a fractal surface, based on a Quadric Koch island, for fluid-contact surfaces, in accordance with exemplary embodiments of the present disclosure.
Figure 1D:
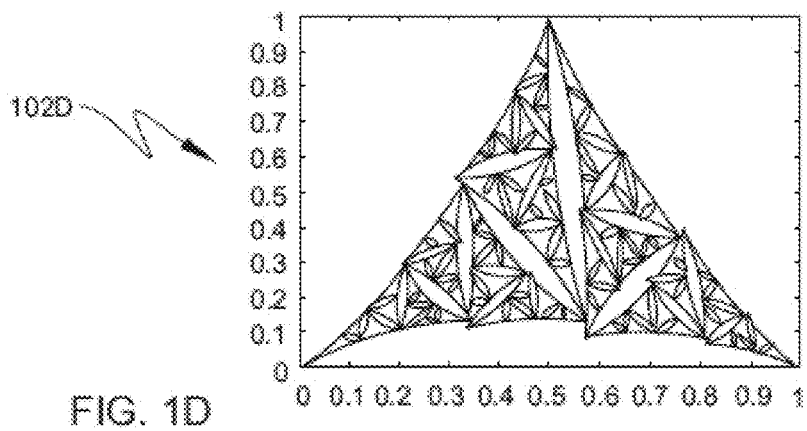
FIG. 1D depicts a surface feature having a fractal shape in the form of a generic affine de Rham curve.

FIG. 1C depicts a top view of a fractal containing fluid-contact surface 102C, based on a Quadric Koch island, for fluid-contact surfaces, in accordance with exemplary embodiments of the present disclosure. Units or cells 104C are shown containing individual fractal textures (depressions or protrusions) 106C. Other fractal shapes can of course be used according to the present disclose. FIG. 1D shows another fractal shape.

FIG. 1D depicts a surface feature 102D having a fractal shape in the form of a generic affine de Rham curve. The curve in the figure is for $\alpha=0.5$, $\beta=1.0$, $\delta=0.33$, $\varepsilon=-0.38$, $\zeta=-0.18$, $\eta=-0.42$. Fractal surfaces can have protrusions or depression having a general outline as shown in FIG. 1D, with peaks or troughs that result in pyramidal shapes. Any suitable type of de Rham curve may be used, and not only the curve shown in the drawing. See, Georges de Rham, *On Some Curves Defined by Functional Equations* (1957), reprinted in *Classics on Fractals*, ed. Gerald A. Edgar (Addison-Wesley, 1993), pp. 285-298, the entire contents of which are incorporated herein by reference.

Of course, while FIGS. 1B-1C show detail of fractal surfaces having a more or less uniform distribution or surface density of fractal features (e.g., 104B in FIG. 1B), the surface density (2D distribution) or linear distribution in any surface direction can vary. In exemplary embodiments, the distribution of surface features can be other than uniform. For example, surface features (such as holes or fractal-shaped features) can have a logarithmic distribution along an airfoil or hydrofoil surface.

Figure 2:
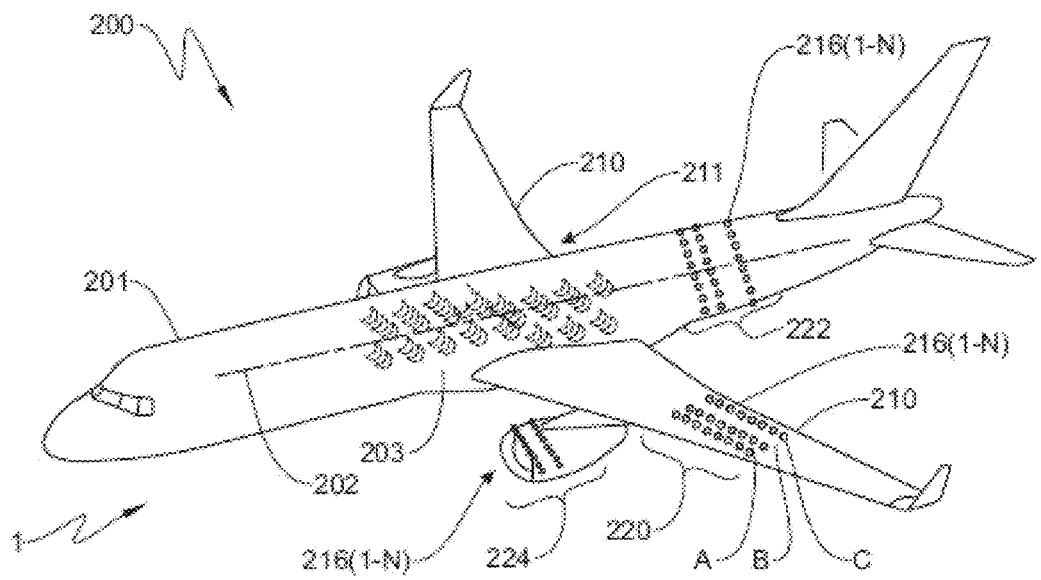
FIG. 2 depicts an airplane with surfaces having fractal textures, in accordance with exemplary embodiments of the present disclosure.

FIG. 2 depicts an airplane 200 with surfaces having fractal textures, in accordance with exemplary embodiments of the present disclosure. Plane 200 has a fuselage 201, with a midline 202, and wings 210. A number of passenger seats 203 and typical direction of flight 1, are shown for ease in comprehension. The surface of the airplane 200 can have a number of surface features 216(1-N) for reducing turbulence effects. The surface features 216(1-N) can be located at desired locations on the airplane 200. Wing locations 220, tail locations 222, and engine locations 224 are shown as examples. The surface features 216(1-N) at each location can be configured in desired ways. Examples include but are not limited to parallel rows with regular spacings, in rectangular arrays, in offset parallel rows, or rows with spacings that are non-uniform. As an example of the latter, wing location 220 depicts rows A-C conforming to a logarithmic (linear density) distribution along the direction of flight 1.

Figure 3:
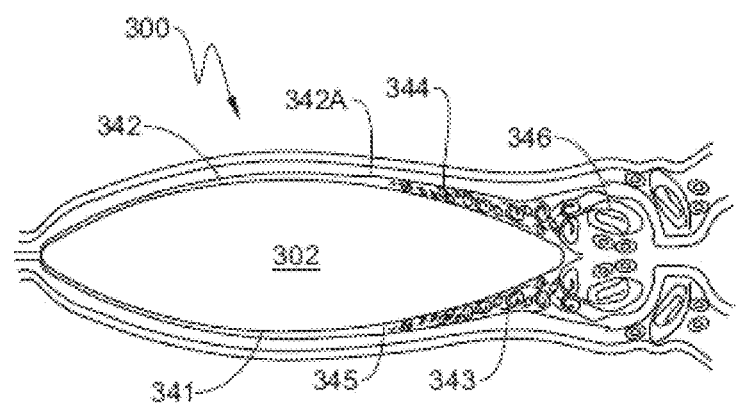
FIG. 3 depicts a cross sectional view of the boundary layer air flow around a prior art streamlined body representing an airship with a view of the detached flows and turbulent wake.

FIG. 3 depicts a cross sectional view 300 of the boundary layer air flow around a prior art streamlined body representing an airship 302 with a view of the detached flows and turbulent wake. The detached air flow 343 and the turbulent wake 346 resulting in drag are shown. Also shown are the onset 345 of the turbulent boundary layer flow and the turbulent boundary layer flow 344 itself all of which contribute to drag on the body. The boundary layer thickness normally increases monotonically as a distance from the foremost portion of the airship along its body 341. At the nose the boundary layer thickness is negligible. As long as the airship body is sufficiently smooth and devoid of a strong temperature gradient, the boundary layer flow 342 is typically laminar in the favorable pressure gradient region of the fore section of the airship where the cross-section is rapidly expanding. The boundary layer thickness thickens slowly and usually does not exceed a few centimeters before the onset 345 of boundary layer turbulence. In the neutral and adverse pressure region along the body, however, the growth of the boundary layer quickens and inevitably becomes less stable and ultimately develops into an unstable flow pattern, marking the onset of turbulent flow 344. The process in known as boundary layer transition. The transition can occur in the neutral region as well as the adverse pressure gradient region as the pressure begins to recover over the aft section of the body. Boundary layer thickens rapidly after the transition and normally separates from body near the tail region.

With continued reference to FIG. 3, the effect of the boundary layer on the drag can be seen as follows, first, the boundary layer adds to the thickness of the body in the form of displacement thickness, which increases the pressure drag, and the shear stress at the surface of the airship body 341 creates skin friction drag. The pressure drag is further enhanced by the lack of closure of the boundary layer, especially after the detachment of the flow, which prevents the surface pressure to fully recover. It can be desirable to postpone or eliminate the transition to turbulence in order to minimize the pressure drag which is typically at least an order of magnitude larger than the skin friction drag. At low Reynolds numbers, which would correspond to an air speed of well under 1 m/s, it is relatively easy to maintain laminar flow. However, at normal air speed, laminar flow can only be dealt with through various prior art boundary layer modification techniques as heretofore discussed such as boundary layer suction, boundary layer blowing or changing the shape of the skin of the airship. The majority of such techniques are impractical owing to mechanical complexities and increased weight. A laminar boundary layer also has a stronger tendency to separate from the body in the strongly adverse pressure region because of the lack of sufficient forward momentum of the laminar boundary layer flow hinders its ability to overcome the negative gradient. Such a separation results in a drastic increase in the pressure drag owing to the large jump in the effective boundary layer thickness as well as the flattening of the pressure recovery. In order to delay flow detachment, it is often advantageous to deliberately trip the boundary layer into turbulence even at the expense of increasing the skin friction drag. The richer flow profile of the turbulent boundary layer enables it to resist the adverse pressure gradient much more effectively.

Figure 4:
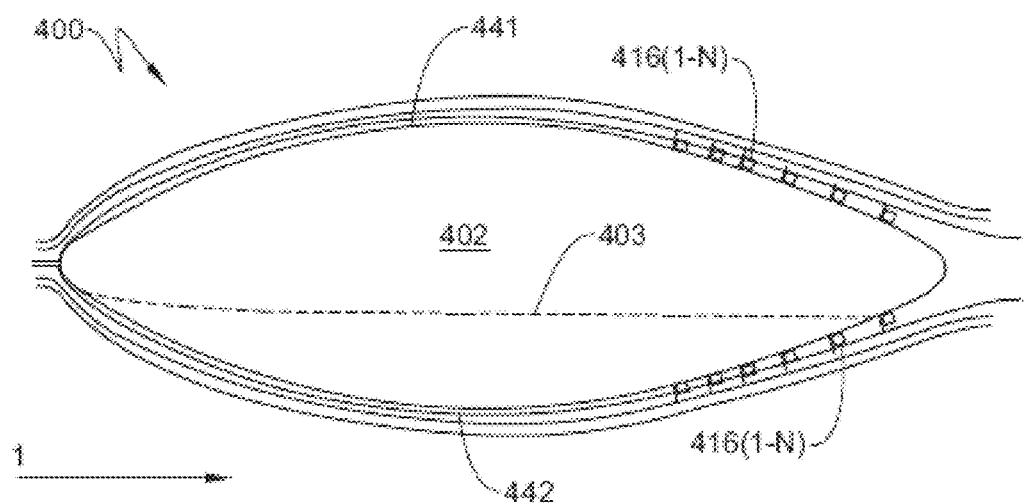
FIG. 4 depicts a cross sectional view of the boundary layer air flow around a streamlined body representing an airship with a view of the laminar flow, in accordance with an embodiment of the present disclosure.

FIG. 4 depicts a cross sectional view 400 of the boundary layer air flow around a streamlined body 441 representing an airship 402 having surface features according to the present disclosure, as well as detail of laminar flow about body 441. Boundary layer air flow 442 is indicated around a streamlined body 402 having surface features 416(1-N). It is seen that a nearly constant boundary layer thickness can be maintained throughout the adverse gradient region in the aft section of the airship. This efficiency in maintaining the constant boundary layer thickness can be afforded by the presence of surface features 416(1-N). Body 441 is shown as generally a closed ogive shape, which because of symmetry can correspond to a top view of a vessel. For other applications, phantom line 403 indicates a shape indicative of a cross section of a wing or fin.

In exemplary embodiments, surface features 416(1-N) are fractal-shaped depressions or protrusions. Examples can include Koch stars, e.g., as shown in FIG. 1B, in the form of surface depressions or indents of about 5 mm to about 30 mm along a major axis and about 5 mm to about 30 mm in depth (or conversely, height); other dimensions can of course be used and can be varied for water applications.

Of course, while an airship body, is referenced for the description of FIG. 4, application can be made to portions of an airship body, e.g., wing, engine, propeller, etc., or to a seagoing vessel as well. Examples of the latter can include the hull of a boat or body, a propeller blade, or hydrofoils of a submersible vessel.

Figure 5:
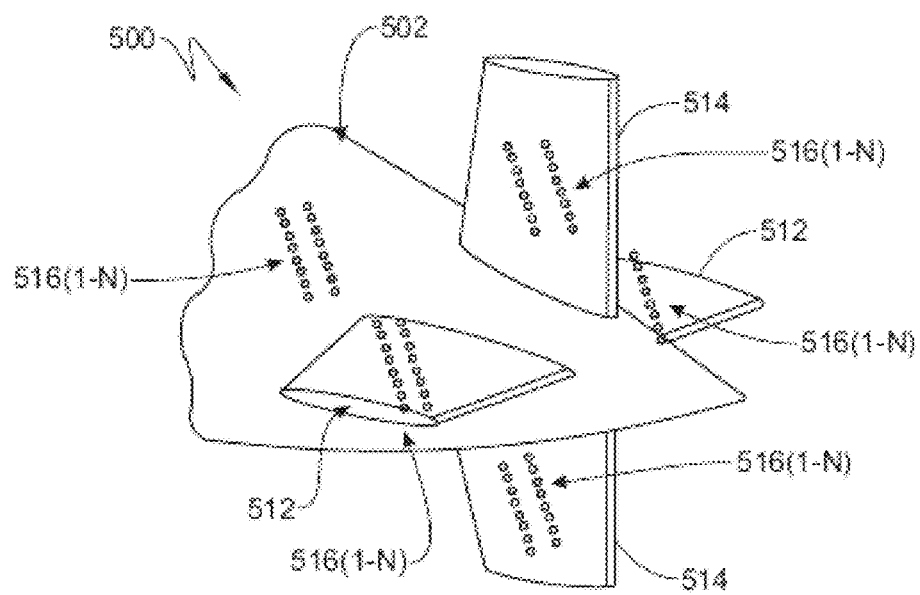
FIG. 5 depicts a partial perspective view of a stern portion of a hull of a submerged water vessel having hydrofoil planes and rudders with fractal surface features, in accordance with exemplary embodiments of the present disclosure.

FIG. 5 depicts a partial perspective view 500 of a stern portion 502 of a hull 500 of a submerged water vessel having hydrofoil planes 512 and rudders 514 with fractal surface features 516(1-N), in accordance with exemplary embodiments of the present disclosure. Surface features 516(1-N) can be fractal-based surface features, depressions, and/or protrusions, e.g., based on a Koch star as shown in FIG. 1B. Surface features 516(1-N) can alternatively be simple holes that have a "fractal" distribution, e.g., logarithmic linear density in one or more particular directions. As shown, surface features 516(1-N) may also be present on the body of the hull itself.

Figure 6:
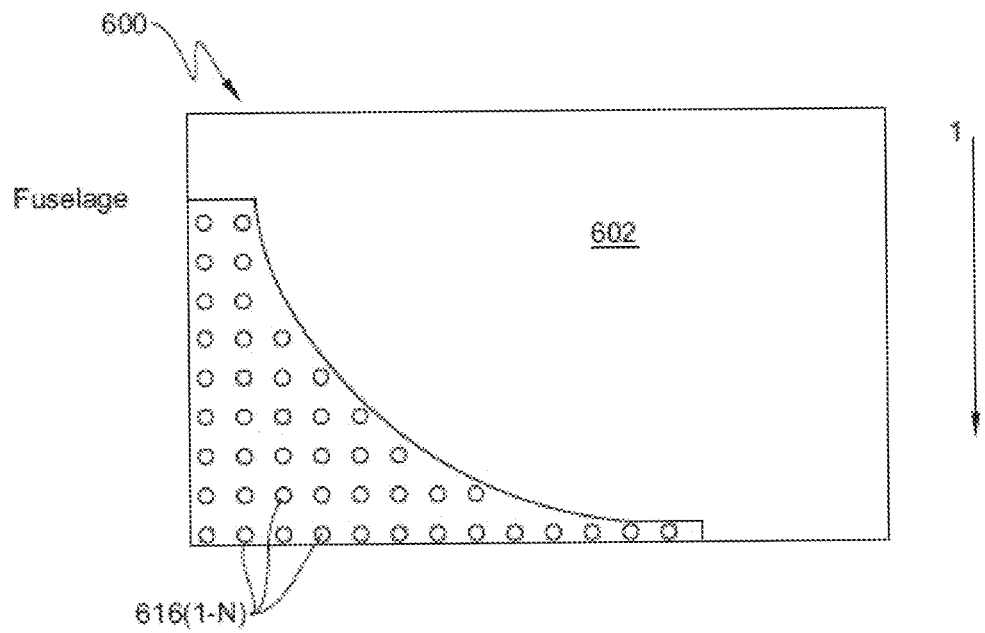
FIG. 6 depicts a fluid-contact surface with a number of turbulence reducing surface features, in accordance with an embodiment of the present disclosure.

FIG. 6 depicts a fluid-contact surface 602 with a number of turbulence reducing surface features 616(1-N), in accordance with an embodiment 600 of the present disclosure. As shown, the surface features can have a non-uniform distribution on fluid-contact surface 602, e.g., wing. Such a configuration may be particularly suited for reducing or mitigating turbulence effects at the junction of a wing and an airplane fuselage, as shown. A direction of wind flow 1 is shown for clarity. In exemplary embodiments, surface features 616(1-N) can be fractal-based surface textures, depressions, and/or protrusions, e.g., based on a Quadric Koch island as shown in FIG. 1C. Surface features 616(1-N) can alternatively be simple holes that have a "fractal" distribution, e.g., logarithmic linear density in one or more particular directions. In exemplary embodiments, the small holes can allow forced gas or liquid to flow out of the airfoil or hydrofoil surface to further minimize deleterious turbulence effects. Water or compressed gas (air) can be used, for example, as described in U.S. Pat. No. 7,290,738, the entire contents of which are incorporated herein by reference.

Figure 7:
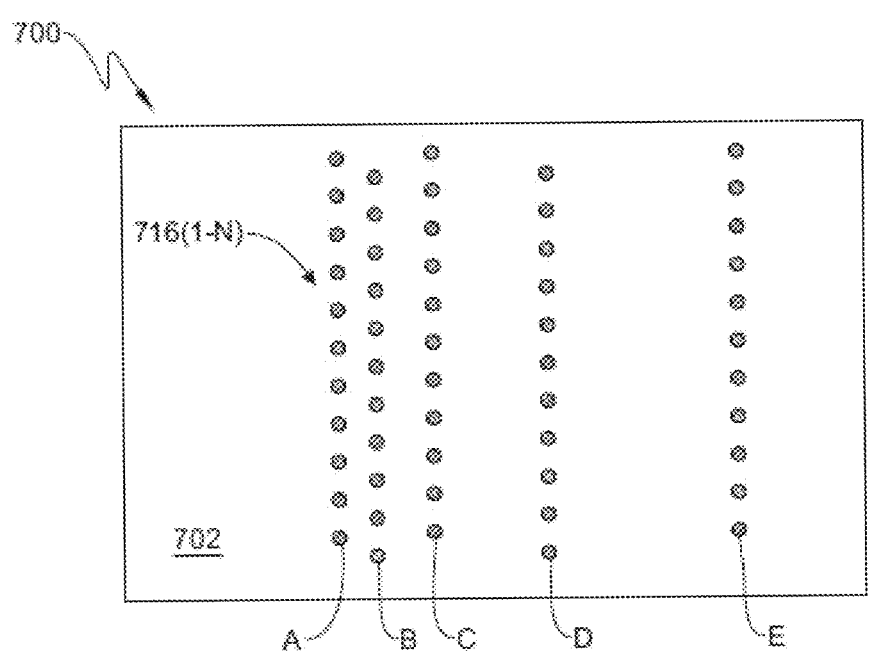
FIG. 7 depicts an alternate fluid-contact surface with a number of turbulence reducing surface features, in accordance with an embodiment of the present disclosure.

FIG. 7 depicts an alternate fluid-contact surface with a number of turbulence reducing surface features, in accordance with an embodiment 700 of the present disclosure. As shown, a fluid-contact surface 702 can include a number of turbulence reducing surface features 716(1-N), in accordance with an embodiment 600 of the present disclosure. As shown by columns (or rows, depending on perspective) (A)-(E), the surface features 716(1-N) can have a non-uniform distribution on fluid-contact surface 702, e.g., wing. As indicated, the distance between successive columns can increase (or decrease) according to a logarithmic progression. In exemplary embodiments, the surface features can be disposed at a particular area of a hydrofoil or air foil, e.g., a trailing edge, or a leading edge.

FIG. 8 depicts an exemplary embodiment of a fractal fluid contact surface 800 having a first fractal feature (e.g., a fractal protrusion) combined with a second fractal feature (e.g., a fractal depression), in accordance with present disclosure. As shown, the fractal fluid contact surface 800 includes a first fractal feature (e.g., a protrusion) 802 that has a perimeter shaped as a fractal, e.g., a $5^{th}$-iteration Koch star. The first fractal feature (e.g., protrusion 802) may itself have or present a second fractal feature (e.g., depression 804) that has a perimeter shaped as a fractal, e.g., a $3^{rd}$ or $4^{th}$-iteration Koch star as shown. Of course, it will be appreciated that while an example has been given with the first fractal feature 802 being a protrusion, it of course can be or include a depression; likewise, while an example of the second fractal feature 804 being a depression, it of course can be or include a protrusion relative to an adjacent surface.

With continued reference to FIG. 8, in exemplary embodiments, the fractal surface 800 can provide a feature, e.g., a second fractal feature 804, which has a combination of features rising above and below an adjacent surface, e.g., first fractal feature 802. For example, neutral axis line 806 (of depression) can indicate a line or axis level with adjacent surface of first fractal feature 802; a first portion (1) of second fractal feature 804 on one side of line 806 can be raised above the adjacent surface of feature 802 while a second portion of second fractal feature 804 can be below the adjacent surface of feature 802. Of course, one of ordinary skill in the art will appreciate that elevation of the first and send portions 1 and 2 can be reversed. Moreover, the elevations of 1 and 2 can be discontinuous, e.g., essentially a step function along 806, or they can vary over a continuous path, e.g., a linear or curved path such that portions of each of 1 and 2 have greater or lesser extent than other portions of 1 and 2.

FIG. 9 depicts an exemplary embodiment of a fractal fluid contact surface having 900 include a fractal protrusion with multiple layers and heights, formed as a von Koch surface, in accordance with present disclosure. Other fractal surfaces may be presented by or included within other embodiments of the present disclosure. Other suitable surfaces and/or perimeters for fractal surfaces according to the present disclosure include, but are not limited to, a 3D Koch curve, a Quadratic cross, a Quadratic flake, a Cesăro fractal, Sierpinski gaskets, Sierpinski triangles, Burning Ship fractals, Sierpinski carpet, Barnsley fern, Dragon curve, surfaces or perimeters generated from the Cantor set, and the like.

Exemplary Embodiments

1. A drag reduction system comprising: a propeller with the body having a fluid contact surface operative for movement within a first fluid where in the body has a longitudinal axis is asymmetrical in cross section along the longitudinal axis; and a plurality of discrete fractal-base surface features disposed in an asymmetrical pattern on a portion of the body and operative to reduce drag when the fluid-contact surface is moving relative to the first fluid; wherein the plurality of fractal-based surface features comprises: (i) a plurality of protrusions on the fluid context surface, each protrusion having a fractal shape, and (ii) a plurality of indents on the fluid context surface each indent having a fractal shape wherein each indent is adjacent to at least one protrusion.

2. A drag reduction system comprising: a fan blade with the body having a fluid contact surface operative for movement within a first fluid where in the body has a longitudinal axis is asymmetrical in cross section along the longitudinal axis; and a plurality of discrete fractal-base surface features disposed in an asymmetrical pattern on a portion of the body and operative to reduce drag when the fluid-contact surface is moving relative to the first fluid; wherein the plurality of fractal-based surface features comprises: (i) a plurality of protrusions on the fluid context surface, each protrusion having a fractal shape, and (ii) a plurality of indents on the fluid context surface each indent having a fractal shape wherein each indent is adjacent to at least one protrusion.

3. A drag reduction system comprising: a fin on aerial vehicle with the body having a fluid contact surface operative for movement within a first fluid where in the body has a longitudinal axis is asymmetrical in cross section along the longitudinal axis; and a plurality of discrete fractal-base surface features disposed in an asymmetrical pattern on a portion of the body and operative to reduce drag when the fluid-contact surface is moving relative to the first fluid; wherein the plurality of fractal-based surface features comprises: (i) a plurality of protrusions on the fluid context surface, each protrusion having a fractal shape, and (ii) a plurality of indents on the fluid context surface each indent having a fractal shape wherein each indent is adjacent to at least one protrusion.

4. A drag reduction system comprising: a wing with the body having a fluid contact surface operative for movement within a first fluid where in the body has a longitudinal axis is asymmetrical in cross section along the longitudinal axis; and a plurality of discrete fractal-base surface features disposed in an asymmetrical pattern on a portion of the body and operative to reduce drag when the fluid-contact surface is moving relative to the first fluid; wherein the plurality of fractal-based surface features comprises: (i) a plurality of protrusions on the fluid context surface, each protrusion having a fractal shape, and (ii) a plurality of indents on the fluid context surface each indent having a fractal shape wherein each indent is adjacent to at least one protrusion.

Accordingly, embodiments of the present disclosure can reduce or mitigate deleterious turbulence effects for airfoils and hydrofoils by providing fluid-contacting surfaces with surface features being defined by or distributed according to fractal geometries.

One skilled in the art will appreciate that embodiments of the present disclosure, including control algorithms/software/signals for designing or manufacturing fractal shaped surface features, can be implemented in hardware, software, firmware, or any combinations of such, and sent as signals over one or more communications networks such as the Internet.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A drag reduction system comprising
propeller with a body having a fluid contact surface operative for movement within a first fluid, wherein the body has a longitudinal axis and is asymmetrical in cross-section along the longitudinal axis; and
a plurality of discrete fractal-based surface features disposed in an asymmetrical pattern on a portion of the body and operative to reduce drag when the fluid contact surface is moving relative to the first fluid;
wherein the plurality of fractal-based surface features comprises:
(i) a plurality of protrusions on the fluid-contact surface, each protrusion having a fractal shape, and
(ii) a plurality of indents on the fluid-contact surface, each indent having a fractal shape;
wherein each indent is adjacent to at least one protrusion.

2. A drag reduction system comprising:
a fan blade with a body having a fluid contact surface operative for movement within a first fluid, wherein the body has a longitudinal axis and is asymmetrical in cross-section along the longitudinal axis; and
a plurality of discrete fractal-based surface features disposed in an asymmetrical pattern on a portion of the body and operative to reduce drag when the fluid contact surface is moving relative to the first fluid;
wherein the plurality of fractal-based surface features comprises:
(i) a plurality of protrusions on the fluid-contact surface, each protrusion having a fractal shape, and
(ii) a plurality of indents on the fluid-contact surface, each indent having a fractal shape;
wherein each indent is adjacent to at least one protrusion.

3. A drag reduction system comprising:
a fin on aerial vehicle with a body having a fluid contact surface operative for movement within a first fluid, wherein the body has a longitudinal axis and is asymmetrical in cross-section along the longitudinal axis; and
a plurality of discrete fractal-based surface features disposed in an asymmetrical pattern on a portion of the body and operative to reduce drag when the fluid contact surface is moving relative to the first fluid;
wherein the plurality of fractal-based surface features comprises:
(i) a plurality of protrusions on the fluid-contact surface, each protrusion having a fractal shape, and
(ii) a plurality of indents on the fluid-contact surface, each indent having a fractal shape;
wherein each indent is adjacent to at least one protrusion.

4. A drag reduction system comprising:
a wing with a body having a fluid contact surface operative for movement within a first fluid, wherein the body has a longitudinal axis and is asymmetrical in cross-section along the longitudinal axis; and
a plurality of discrete fractal-based surface features disposed in an asymmetrical pattern on a portion of the body and operative to reduce drag when the fluid contact surface is moving relative to the first fluid;

wherein the plurality of fractal-based surface features comprises:
- (i) a plurality of protrusions on the fluid-contact surface, each protrusion having a fractal shape, and
- (ii) a plurality of indents on the fluid-contact surface, each indent having a fractal shape;

wherein each indent is adjacent to at least one protrusion.

\* \* \* \* \*